United States Patent
Kuenzel et al.

(10) Patent No.: US 8,899,055 B2
(45) Date of Patent: Dec. 2, 2014

(54) DEVICE AND METHOD FOR COOLING AND DEHUMIDIFYING ROOM AIR

(75) Inventors: Hartwig Kuenzel, Holzkirchen (DE); Klaus Sedlbauer, Holzkirchen (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 109 days.

(21) Appl. No.: 11/996,217

(22) PCT Filed: Jul. 18, 2006

(86) PCT No.: PCT/EP2006/007062
§ 371 (c)(1), (2), (4) Date: Jan. 18, 2008

(87) PCT Pub. No.: WO2007/009752
PCT Pub. Date: Jan. 25, 2007

(65) Prior Publication Data
US 2008/0229765 A1    Sep. 25, 2008

(30) Foreign Application Priority Data
Jul. 19, 2005    (DE) .......................... 10 2005 034 141

(51) Int. Cl.
F24F 5/00    (2006.01)
F24F 3/14    (2006.01)
F24F 1/00    (2011.01)
F24F 6/00    (2006.01)

(52) U.S. Cl.
CPC ......... *F24F 5/0035* (2013.01); *F24F 2003/144* (2013.01); *F24F 3/1417* (2013.01); *Y02B 30/545* (2013.01); *F24F 2001/0088* (2013.01); *F24F 2006/001* (2013.01); *F24F 2006/003* (2013.01)
USPC ............................................................ 62/94

(58) Field of Classification Search
CPC . F24F 5/0035; F24F 3/1417; F24F 2006/003; F24F 2001/0068; F24F 2006/001; F24F 2003/144; F24F 3/1411; Y02B 30/545
USPC ........... 62/92–93, 96–97, 240, 271, 332, 434, 62/94; 210/252; 261/106; 55/240, 495, 55/504, 257.5; 95/210, 223, 228
See application file for complete search history.

(56) References Cited

U.S. PATENT DOCUMENTS 2,221,787 A * 11/1940 Downs et al. ..................... 95/10
2,405,169 A *  8/1946 Sutton ............................... 62/94
(Continued)

FOREIGN PATENT DOCUMENTS

DE    257969    12/2011
EP    1120609 A1 *  8/2001    ............... F24F 3/14
(Continued)

*Primary Examiner* — Frantz Jules
*Assistant Examiner* — Emmanuel Duke
(74) *Attorney, Agent, or Firm* — Greenblum & Bernstein, P.L.C.

(57) ABSTRACT

The invention relates to a system and method for cooling and dehumidifying air in a room. The system includes a processing unit structured and arranged to process a coolant to achieve a cooling that exceeds cold due to evaporation, wherein the coolant cools and dehumidifies air coming into contact with the coolant. The system also comprises a distribution unit arranged to expose the coolant to the air and a collecting unit structured to feed the coolant that has come into contact with the air into the processing unit.

17 Claims, 1 Drawing Sheet

(56) References Cited

U.S. PATENT DOCUMENTS

| | | | |
|---|---|---|---|
| 4,031,180 A * | 6/1977 | Bohanon | 261/106 |
| 4,707,995 A * | 11/1987 | Assaf | 62/94 |
| 4,753,401 A * | 6/1988 | Bechert | 244/130 |
| 4,981,021 A * | 1/1991 | Assaf | 62/271 |
| 5,288,018 A * | 2/1994 | Chikazumi | 239/20 |
| 5,966,953 A * | 10/1999 | Murr et al. | 62/171 |
| 6,182,454 B1 * | 2/2001 | McNeilan | 62/176.4 |
| 6,279,835 B1 * | 8/2001 | Hansen | 239/20 |
| 2002/0017108 A1 * | 2/2002 | Schooley | 62/240 |
| 2002/0033469 A1 * | 3/2002 | Chandler et al. | 252/69 |
| 2002/0116935 A1 * | 8/2002 | Forkosh et al. | 62/93 |
| 2005/0008608 A1 * | 1/2005 | Parkhurst et al. | 424/76.2 |

FOREIGN PATENT DOCUMENTS

| | | |
|---|---|---|
| FR | 2 637 510 | 4/1990 |
| WO | 95/22724 | 8/1995 |
| WO | 01/16546 | 3/2001 |
| WO | 2006/058959 | 6/2006 |

* cited by examiner

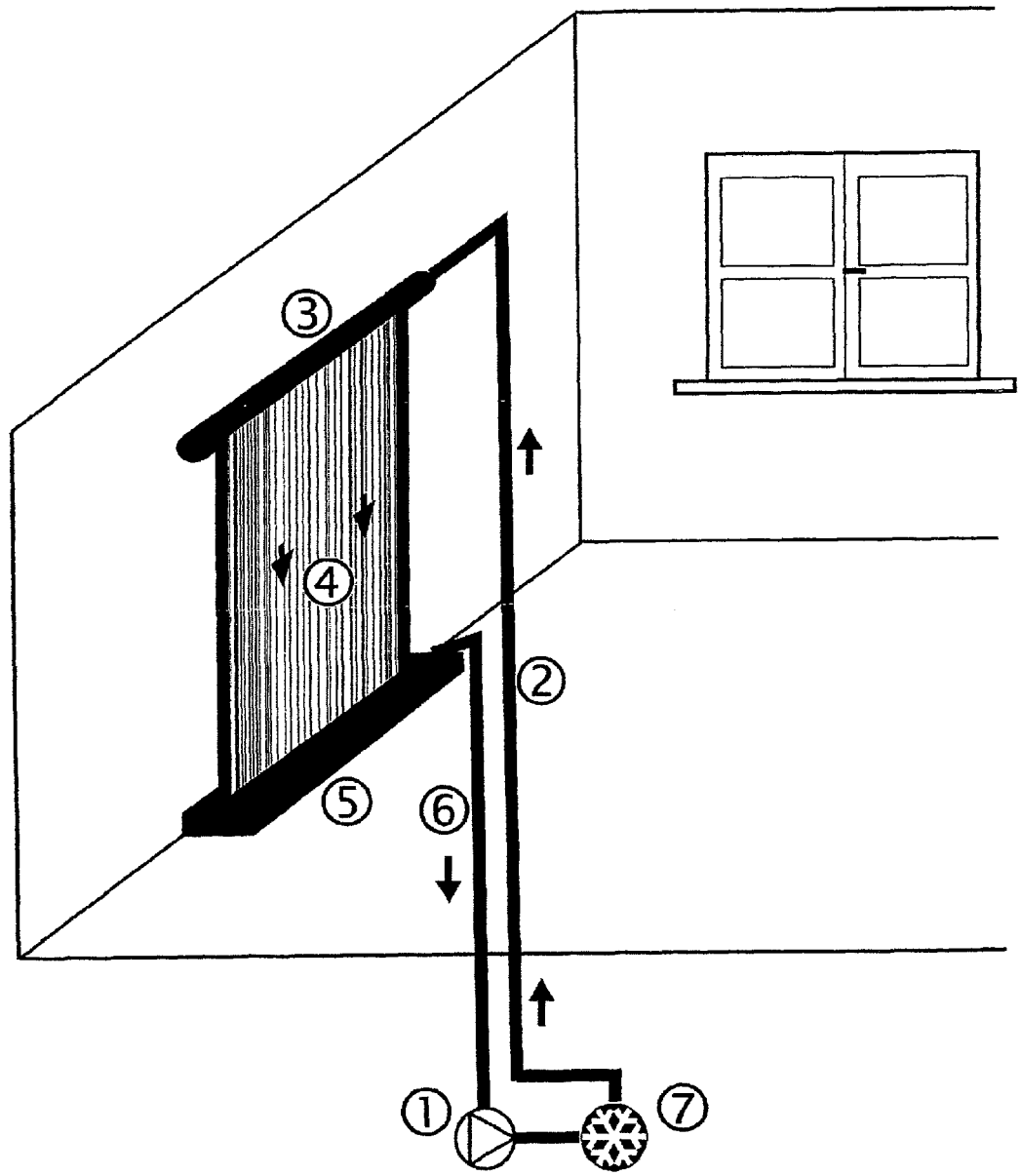

DEVICE AND METHOD FOR COOLING AND DEHUMIDIFYING ROOM AIR

CROSS-REFERENCE TO RELATED APPLICATIONS

The present application is a U.S. National Stage of International Patent Application No. PCT/EP2006/007062 filed Jul. 18, 2006, and claims priority under 35 U.S.C. §119 of German Patent Application No. 10 2005 034 141.1 filed Jul. 19, 2005. Moreover, the disclosure of International Patent Application No. PCT/EP2006/00706 is expressly incorporated by reference herein in its entirety.

BACKGROUND OF THE INVENTION

1. Field of the Invention

The invention relates to a device and method for cooling and dehumidifying room air.

2. Discussion of Background Information

Circulating air conditioners are primarily known from the prior art for heating and cooling room air in buildings. However, the operation of these devices is often associated with noise emissions and drafts. Therefore, water-bearing cooling elements such as, e.g., cooling ceilings have become established on the market. In cooling elements of this type, room air is cooled by a coolant flowing through cooling elements. Heat is extracted from the room air and transferred to the cooling element through thermal radiation and thermal conduction. The heat is transported away from the cooling element by the coolant. However, cooling elements of this type have a limited cooling capacity. Additionally, the temperatures of the cooling elements may not be kept too low, so as to avoid a separation of humidity present in the air, which would lead to mold formation. Moreover, cooling elements of this type are not suitable for dehumidifying room air, since the separation of the humidity present in the air raises the danger of mold formation on the cooling element, as previously described.

Cooling air for a greenhouse by pumping warm air past water that is sprayed is known from WO 06058959 A1. The heat of the air is transferred to the cooling water. However, a recirculation of air remains necessary to cool a room.

SUMMARY OF THE INVENTION

An aspect of the present invention is to overcome the disadvantages of the prior art and to disclose a device and a method for cooling and dehumidifying air, which avoids the noise emissions and drafts of recirculating air conditioners as well as the capacity limitation and mold formation of cooling elements. This aspect is attained through a device for cooling and dehumidifying room air comprising a processing unit. The processing unit may be embodied to process a coolant such that the coolant is suitable for dehumidifying and/or cooling air upon contact, thereby achieving a cooling that exceeds the cold due to evaporation. The device further comprises a distribution unit, which is suitable for causing the coolant to flow past the air in the room with direct contact. Additionally, the device comprises a collecting unit, which is suitable for feeding coolant that has flowed past the air back to the processing unit.

The aspect can also be attained through a method for cooling and/or dehumidifying room air. The method comprises processing the coolant such that it is suitable for dehumidifying and/or cooling the air upon contact, thereby achieving a cooling that exceeds the cold from evaporation. The method further comprises distributing the coolant in a room where people may be located, so that the coolant flows past the air with direct contact. The method also includes collecting coolant that has flowed past the air for reprocessing, so that a cooling circuit is produced.

Embodiments for achieving the aspect of the present invention include a distribution unit that is or contains a device in the manner of a fountain installed in a room. Embodiments may include a distribution unit that is a wall or room unit or contains a wall or room unit, on which a thin liquid film can flow past or flows past. The distribution unit may also be embodied in the form of coolant grooves on or under the floor and/or the ceiling of the room. Moreover, the distribution unit can be a cooling device installed in a room and have at least one opening for the air to be processed, in which a liquid film can flow or flows.

Embodiments for achieving the aspect may also include a processing unit as a cooler for the coolant. The processing unit can be embodied such that the concentration of additives that reduce the vapor pressure of the coolant can be increased. Additionally, the coolant can contain additives that avoid turbulences in the flow. In embodiments, the coolant can also contain additives that can bind contaminants or odors in the room air.

The invention recognizes that a device for cooling and/or dehumidifying room air and containing the following components must be created.

First, a processing unit must be provided, which can process coolant that is suitable for dehumidifying and/or cooling air upon contact therewith, thereby achieving a cooling that exceeds the cold due to evaporation. Furthermore, a distribution unit is provided, which is suitable for causing the coolant to flow past the air and have direct contact with the air. Finally, a collecting unit is provided, which is suitable for feeding coolant that has flowed past the air back to the processing unit. A device of this type makes it possible for room air that has direct contact with the coolant to be cooled and/or dehumidified. In particular it is desirable to cool and to dehumidify the air simultaneously.

It is known from the prior art how to cool the air of a room with coolant that flows by the air and has direct contact with the air; for instance, fountains that can achieve cooling are often installed in cafés. The water is usually recirculated and heated by longer operation of the fountain. A cooling effect is also achieved by evaporation, but, particularly with humid weather conditions, no increase in comfort is achieved. This is because, although the uncomfortably high temperatures can be somewhat reduced, the air humidity is increased due to evaporation. Cooling that exceeds the cold from evaporation would be conceivable, e.g., through the constant use of cooler fresh water, but it would be uneconomical, since it would lead to an unjustifiably high requirement for fresh water. Not until the interaction of the processing unit, distribution unit, and collecting unit provided according to the invention has it been possible to produce a device with which room air can be cooled without humidification while at the same time forming a coolant circulation, wherein at most small amounts of coolant need to be replenished.

A distribution unit, processing unit, and collecting unit can be structurally combined. In particular the distribution unit can contain the collecting unit. It is also possible for the collecting unit to first feed the coolant to another distribution unit, instead of directly feeding the coolant to the processing unit. Depending on the mode of operation, forms of cooling known from the prior art can be carried out exclusively by cold due to evaporation with the device according to the invention for cooling without humidification. However, the device differs from the prior art in that cooling that exceeds the cold from evaporation is possible. The cooling exceeding the cold due to evaporation is achieved by heat being transferred from the air to the coolant, which thereby increases its sensible heat, that is, absorbs heat by increasing the temperature. Comfort can be improved if part of the cooling is carried out by cold due to evaporation and the humidification of the air during cooling is only reduced and not avoided. Although different coolants are conceivable, above all water and mixtures containing water are suitable as a coolant.

Air conditioners are likewise known, wherein room air bubbles through cooled water or is sprayed therewith (so-called air washers); however, in these technologies, the air is removed from the room with the aid of blowers and subsequently returned therein. Consequently, there are the same problems here (e.g., noise emissions, drafts), as with conventional air conditioners. This is precisely not the case according to the invention. Furthermore, with air conditioners of this type, cooling through radiation cannot be used since the cool coolant cannot absorb any radiation from the room to be cooled. With the present invention it is also possible to use the radiation cooling of the coolant.

It should be made clear at this point that the term "room" primarily refers to rooms in buildings. However, the term "room" should be taken to have a broad meaning. It covers any area where people are, whose comfort is to be increased. It therefore also includes passenger compartments in vehicles and aircrafts. The decisive factor is that the air is processed in the area, i.e., the distribution unit is located where people may be, whose comfort is to be increased. Air is therefore not processed in a separate unit and then pumped into this area. The term "air" should not be narrowly interpreted; for instance, special gas mixtures for ventilating rooms that contain moisture are also covered by this term.

A suitable distribution unit for the coolant is a fountain installed in a room. This can be designed in an optically appealing manner. Commercially available components can also be used as fountains in rooms are known.

It is likewise conceivable for the distribution unit to be a wall or room unit on which a thin liquid film can flow past or flows past. With a thin liquid film, it is possible to create a large surface of flowing coolant, which permits efficient cooling or dehumidification.

One way of realizing the distribution unit is to arrange coolant grooves on or under the floor or the ceiling (with corresponding air openings) of the room. A space-saving device is thus created that is not very noticeable.

The processing unit is preferably a cooler for the coolant, since an adequate cooling makes it possible for the coolant, when flowing past air, to cool the air without humidifying it. Coolers of this type are adequately known in the prior art and can be obtained at a reasonable cost. There are also coolers that operate in an energy-efficient manner, the running costs of these coolers are kept within a limited range. If necessary, moisture is removed from the air when the cooled coolant flows past the air to be cooled. The water that reaches the cooling circuit does not present any problems since, in general, the coolant is primarily composed of water. If necessary, suitable overflow containers or outlets are to be provided in the system.

A further or additional way of realizing the processing unit is to add additives that reduce the vapor pressure of the coolant. If, for example, water is used as a coolant, the vapor pressure can be reduced, e.g., through the addition of substances (e.g., salts) with a correspondingly hygroscopic action. A similar effect can also be achieved by adding a liquid to water.

Substances that are miscible with water can thereby be added, whereby a solution is produced, the vapor pressure of which can be lower than that of pure water. Likewise substances that are not miscible with water can be added. The lowering of the surface can lead to a reduction of the vapor pressure. This means that even at higher coolant temperatures, the evaporation of the water can be reduced so far that the condensation of the indoor air humidity on the surface of the coolant predominates and no moisture is transferred to the room air. In fact, moisture is removed from the room air. The concentration of the added substances (e.g., hygroscopic salts) that reduce the vapor pressure is thereby reduced so that a regeneration of the coolant must take place. These substances can be added again in the processing unit. However, for continuous operation it is particularly expedient to expel water absorbed by the coolant in the processing unit, e.g., by evaporation or ice crystal formation, thus reestablishing the original concentration of the additions. Admittedly, this is associated with a certain energy expenditure. For evaporation, the coolant must be either heated or exposed to a lower ambient pressure. For the regeneration of the coolant through ice crystal formation, it must be further cooled and the ice skimmed off. However, these measures can also take place in a side stream that is subsequently mixed with the main stream.

A stable and quiet flow is achieved if additives that avoid turbulences in the flow are added to the coolant. If water is used as the coolant, long-chain polymers are suitable for laminarizing the flow. Such additives suppress the formation of microeddies and thus produce a low-friction and low-noise laminar flow, even with higher Reynolds numbers.

Irrespective of additives that avoid turbulences in the flow, additives with a biocide action are also conceivable. This means hygiene problems can be avoided. For increased acceptance of the device according to the invention, suitable odor-active substances can also be added to the coolant. The addition of other substances to increase the capacity of the coolant to absorb contaminants in the room air is also conceivable.

BRIEF DESCRIPTION OF THE DRAWINGS

FIG. 1 shows an exemplary embodiment of the present invention.

DETAILED DESCRIPTION OF THE PRESENT INVENTION

The sketch according to FIG. 1 is designed to explain an exemplary embodiment. Water is guided with the pump 1 through the feed line 2 to a horizontal pipe 3, which has an aperture slot on the underside. The water flows out through this aperture slot as a water film 4. A collecting tank 5 is attached below, from which the water is pumped back to the pump 1 through the drain line 6. The water is pumped again from the pump 1 to the feed line 2, during which it is cooled again in the cooler 7 arranged after the pump 2.

The invention claimed is:

1. A device for cooling and dehumidifying air in a room and/or specified area for people, comprising:
a processing unit structured and arranged to process a coolant to achieve a cooling that exceeds cold due to evaporation, wherein the coolant cools and dehumidifies air coming into contact with the coolant without aid of an air circulating device;

a distribution unit arranged to guide the coolant in a manner open to the room and/or specified area for people so as to expose the coolant to the air while the air is in the room and/or specified area; and a collecting unit structured to feed the coolant that has come into contact with the air into the processing unit.

2. The device of claim 1, wherein the coolant cools and dehumidifies the air in the room and/or specified area.

3. The device of claim 2, wherein the distribution unit comprises one or more coolant grooves.

4. The device of claim 3, wherein the distribution unit is positionable at least one of on and under at least one of a floor and a ceiling of the room and/or specified area.

5. The device of claim 2, wherein the coolant includes additives to bind contaminants and/or odors in the air in the room and/or specified area.

6. The device of claim 1, wherein the distribution unit comprises a fountain installed in the room and/or specified area.

7. The device of claim 1, wherein the distribution unit comprises a wall or room unit.

8. The device of claim 7, wherein a thin liquid film of the coolant is arranged to flow over the wall or room unit.

9. The device of claim 8, wherein the distribution unit comprises a cooling device, which includes at least one opening for the liquid film to flow, the at least one opening structured to allow the air to be processed.

10. The device of claim 1, wherein the processing unit comprises a cooler for the coolant.

11. The device of claim 1, wherein the coolant includes one or more additives.

12. The device of claim 11, wherein the one or more additives are provided in a concentration to adjust vapor pressure of the coolant.

13. The device of claim 11, wherein the concentration of the one or more additives reduces vapor pressure of the coolant.

14. The device of claim 11, wherein the coolant includes additives to avoid turbulence in the flow.

15. A method for cooling and dehumidifying air in a room for people, comprising:

processing a coolant to achieve a cooling that exceeds cold due to evaporation to cool and dehumidify air coming into contact with the coolant without aid of an air circulating device;

guiding the coolant to be open to the room so as to directly contact the air while the air is in the room; and collecting the coolant that that has come into contact with the air.

16. The method of claim 15, further comprising reprocessing the collected coolant and repeating the guiding, collecting, and reprocessing to produce a cooling circuit.

17. A device for cooling and dehumidifying air in a room and/or specified area for people, comprising: a processing unit structured and arranged to process a coolant to achieve a cooling that exceeds cold due to evaporation, wherein the coolant cools and dehumidifies air coming into contact with the coolant without aid of an air circulating device; a distribution unit arranged to guide the coolant to flow as a thin liquid film over one of a wall or room unit in a manner open to the room and/or specified area for people so as to expose the coolant to the air while the air is in the room and/or specified area; and a collecting unit structured to feed the coolant that has come into contact with the air into the processing unit.

* * * * *